Figure 1:
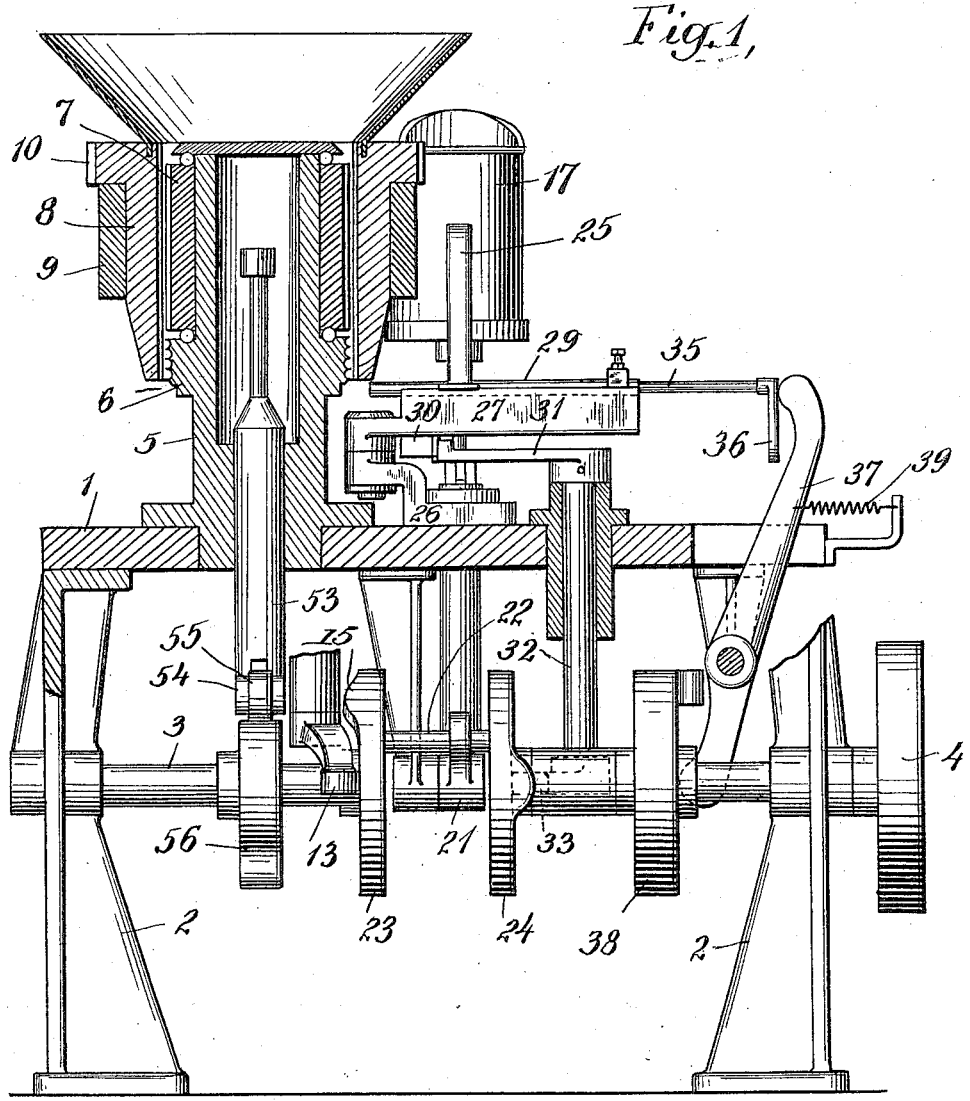

A. C. PRATT.
MACHINE FOR MAKING LINK MESH.
APPLICATION FILED JAN. 29, 1912. RENEWED OCT. 11, 1913.

1,139,799.

Patented May 18, 1915.
5 SHEETS—SHEET 1.

WITNESSES:

INVENTOR

BY

ATTORNEYS

A. C. PRATT.
MACHINE FOR MAKING LINK MESH.
APPLICATION FILED JAN. 29, 1912. RENEWED OCT. 11, 1913.

1,139,799.

Patented May 18, 1915.
5 SHEETS—SHEET 2.

A. C. PRATT.
MACHINE FOR MAKING LINK MESH.
APPLICATION FILED JAN. 29, 1912. RENEWED OCT. 11, 1913.
1,139,799.
Patented May 18, 1915.
5 SHEETS—SHEET 4.
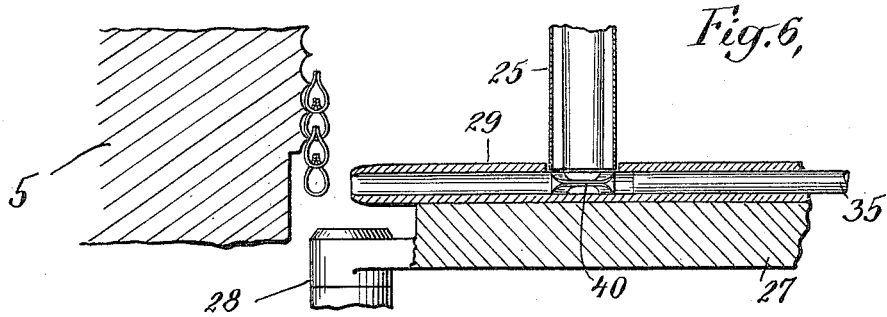
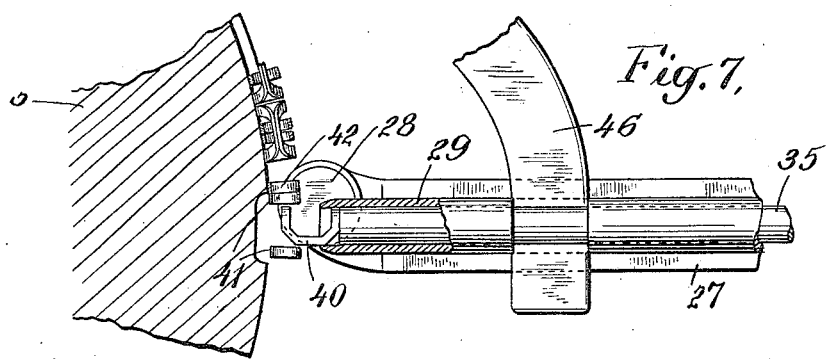
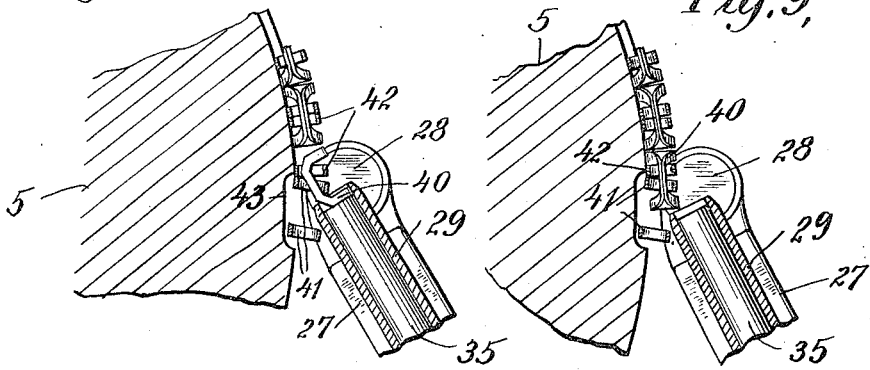
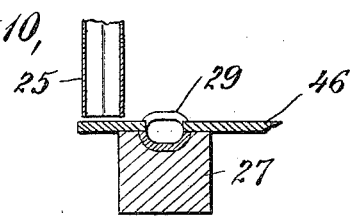
WITNESSES:
INVENTOR
A. C. Pratt
BY
Edmunds & Edmunds
ATTORNEYS A. C. PRATT.
MACHINE FOR MAKING LINK MESH.
APPLICATION FILED JAN. 29, 1912. RENEWED OCT. 11, 1913.
1,139,799.
Patented May 18, 1915.
5 SHEETS—SHEET 5.
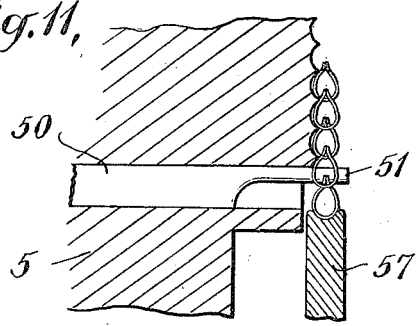
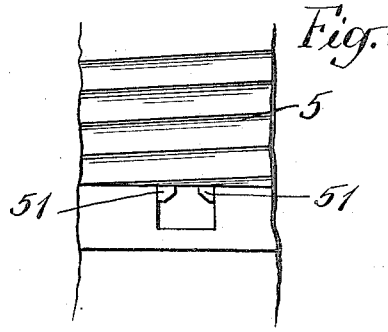
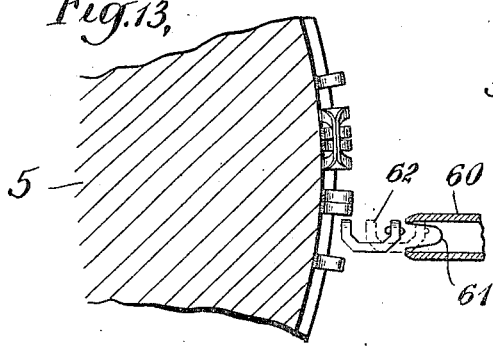
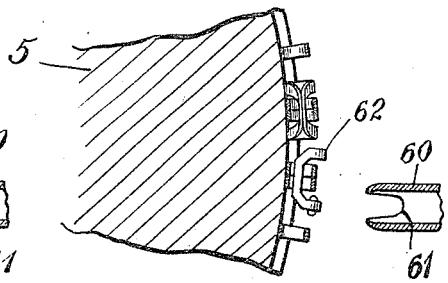
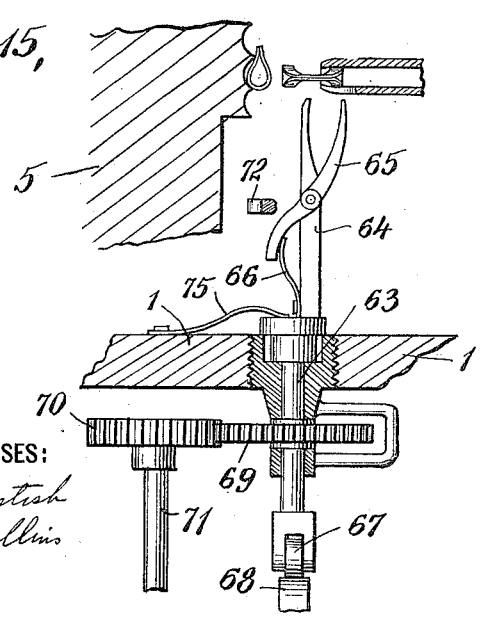
WITNESSES:
J. McIntosh
J. F. Collins
INVENTOR
A. C. Pratt
BY
Edmonds & Edmonds
ATTORNEYS
THE NORRIS PETERS CO., PHOTO-LITHO., WASHINGTON, D. C.

UNITED STATES PATENT OFFICE.

ALPHONSO C. PRATT, OF MONTCLAIR, NEW JERSEY.

MACHINE FOR MAKING LINK MESH.

1,139,799.   Specification of Letters Patent.   Patented May 18, 1915.

Application filed January 29, 1912, Serial No. 673,999. Renewed October 11, 1913. Serial No. 794,717.

*To all whom it may concern:*

Be it known that I, ALPHONSO C. PRATT, a citizen of the United States, residing at Montclair, in the county of Essex and State of New Jersey, have invented certain new and useful Improvements in Machines for Making Link Mesh, of which the following is a specification.

This invention relates to machines for making link-mesh.

The invention is directed to the provision of an improved form of link-mesh machine adapted particularly for making mesh from links of a special design.

The mesh made with the improved machine consists of a plurality of links, each interlinked with two other links. The links are of a shape approximating three sides of a rectangle and have loops at each of their ends, each loop adapted to encircle the body portion of another link. Preferably each link is made by punching from sheet-metal a link of a shape approximating an oblong or oval, then folding this link upon itself and spreading the two folded portions at the bight of the fold so as to form loops at the ends of the link thus made. In making a link-mesh fabric from such links, each link has one end threaded through the loops of two adjacent links, so that these two links encircle the body portion of the newly added link and the latter has its ends free to receive the body portions of two links to be added thereafter.

The invention involves, broadly, the general features of the machine whereby fabric of the character above mentioned is made, and additionally various individual features employed in the machine, such as the mechanism for automatically feeding links of the character above described into position to be added to the fabric by the threading mechanism, mechanism for automatically manipulating a link of the character above described so as to add it to a fabric in proper relation to the links forming the fabric, and mechanism for opening the loops at the ends of links of the character above described, so as to permit of more readily threading new links through such loops.

I have illustrated one embodiment of the invention in the accompanying drawings, in which—

Figure 2:
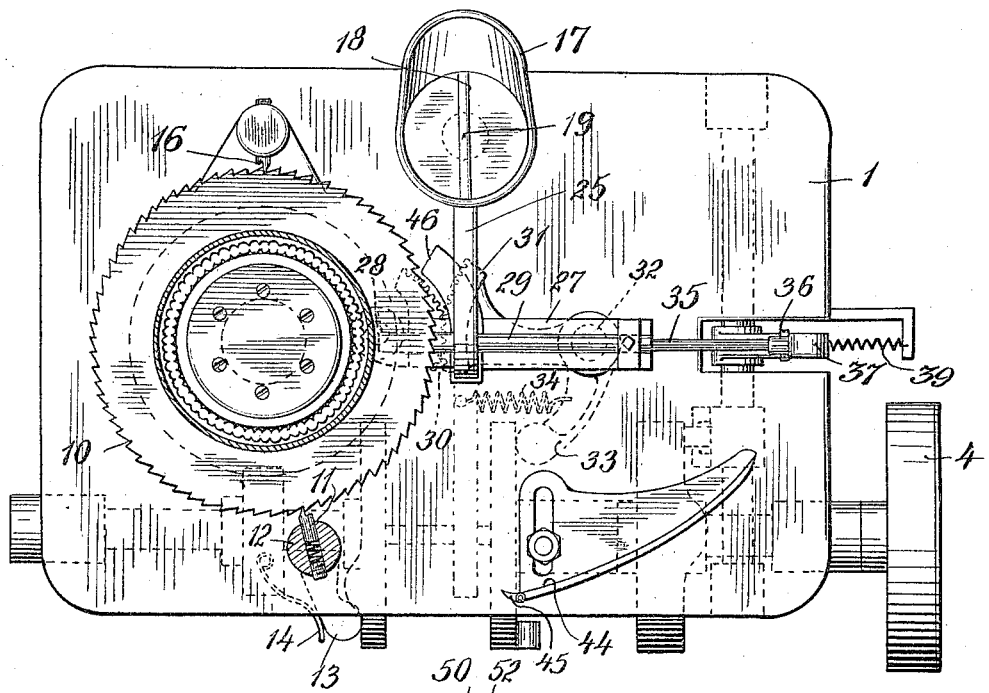
Figure 3:
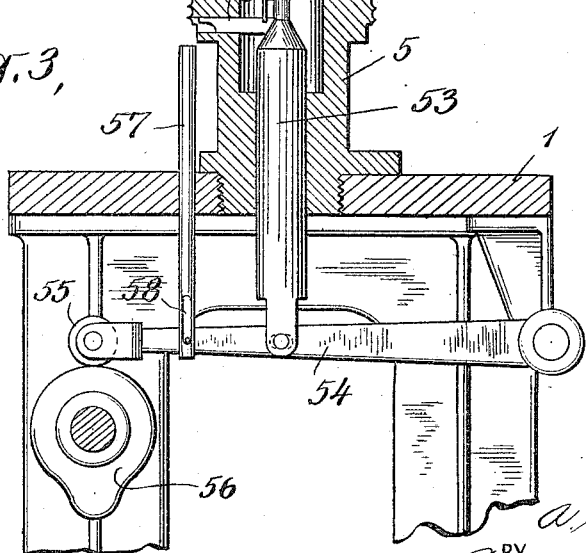
Figure 4:
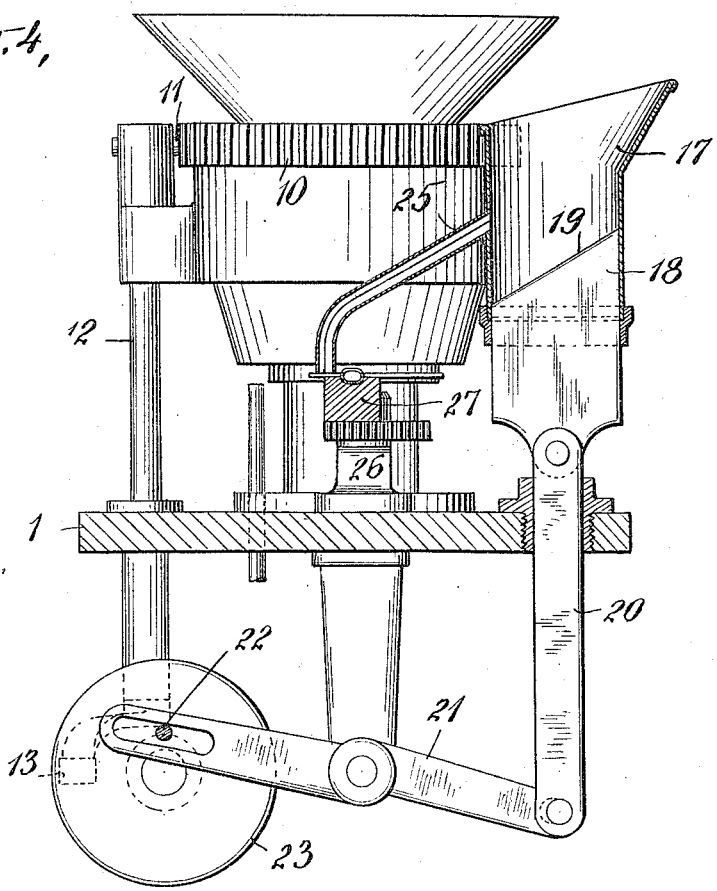
Figure 5:
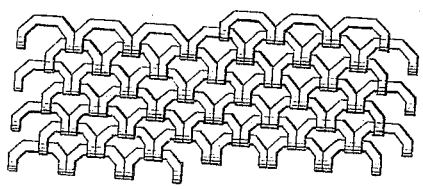

Figure 1 is a sectional elevation of the machine, Fig. 2 is a top view of the same, Fig. 3 is a sectional detail view hereinafter described, Fig. 4 is a sectional elevation, showing the link-feeding mechanism, Fig. 5 is a view of the completed mesh, Figs. 6, 7, 8 and 9 are detail views, illustrating successive positions of the threading mechanism, Fig. 10 is a detail view, showing the location of the end of the chute through which the links are fed, Figs. 11 and 12 are detail views illustrating the mechanism for opening the loops at the ends of the links, Figs. 13 and 14 are views illustrating the action of parts which may be employed in practising the invention, Fig. 15 is a sectional elevation illustrating the modified mechanism for operation in accordance with Figs. 13 and 14, and Fig. 16 is a detail view showing certain of the parts illustrated in Fig. 15.

Referring first to Figs. 1 to 10, the machine comprises a supporting plate 1, mounted upon standards 2 rising from a suitable table or other support. In the standards 2 are bearings for a power-shaft 3, which is driven in any suitable manner, as by means of a belt running over the pulley 4. Upon the plate 1, is mounted a support for the fabric made on the machine, this including mechanism for feeding the fabric step by step, so as to present the proper points successively to the threading mechanism, in order that new links will be added to the fabric at the proper positions. This fabric-supporting means is preferably constructed in the manner illustrated and described in Patent No. 948,615, granted to me February 8th, 1910. The support consists of a stationary mandrel 5 projecting upwardly from the plate 1 and having thereon a portion 6 which is provided with a spiral groove upon its cylindrical surface. Above the portion 6, is a sleeve 7 mounted for rotation upon the stationary mandrel 5 and having parallel vertical grooves upon its cylindrical surface. A second sleeve 8 incloses the sleeve 7 and the spirally threaded portion 6, this sleeve 8 having parallel vertical grooves upon its interior surface. Between the interior surface of the sleeve 8 and the exterior surfaces of the sleeve 7 and the portion 6, is a narrow space adapted to receive a piece of link-mesh fabric in the form of a sleeve. The outer sleeve 8 is mounted for rotation in a ring 9, which is supported upon the table 1. Above this ring, the sleeve 8 has ratchet-teeth 10 formed thereon, adapted to be engaged by a pawl 11 (Fig. 2). This pawl is spring-pressed toward the ratchet 10 and is carried by the upper end of a rod 12 (Figs. 2 and 4) which is rotatable in bearings carried by the ring 9 and the plate 1.

At its lower end, the rod 12 has a crank-arm 13, which is held by a spring 14 in engagement with a cam 15 mounted upon the power-shaft 3. By means of this mechanism, each time the rotary shaft 3 completes one revolution, the arm 13 and rod 12 are oscillated about the axis of the rod and the pawl 11 turns ratchet 10 and sleeve 8 one step. At the end of this step movement, the sleeve 8 is held by a spring-pressed retaining pawl 16 (Fig. 2). When the sleeve 8 is so rotated one step, it carries with it the sleeve of fabric inclosed by it, as the vertical ridges upon the interior surface of the sleeve 8 enter the vertical depressions in the surface of the mesh and in that way secure a hold on the sleeve of fabric sufficient to cause the fabric to turn with the sleeve. As the exterior sleeve 8 turns thus, the interior sleeve 7 turns with it and the vertical ridges upon the interior sleeve 7 aid materially in insuring that the fabric will move step by step accurately with the outer sleeve 8. When the sleeve of fabric is turned thus about its axis, it is caused to move upwardly by the spiral ridges upon the surface of the portion 6 of the mandrel 5. These ridges enter depressions formed in the surface of the fabric by the arrangement of the links thereof, and in this way secure a sufficient hold upon the fabric to insure that the latter will be moved upwardly in accordance with the spiral thread on the portion 6; that is, each time the fabric is stepped around by the sleeves 8 and 7, it will be moved upwardly a predetermined amount by the spiral ridges on the portion 6.

The fabric made on the machine shown in the drawings is illustrated in Fig. 5. Each link preferably consists of a sheet-metal punching and is initially of a shape approximating a hollow rectangle. This punching is then folded upon itself, and its ends are bent to form loops. It will be seen that the links are arranged in rows both vertically and horizontally, and in the sleeve of fabric on the support above described the rows, which in the finished fabric are horizontal, are arranged spirally with a pitch equal to the pitch of the spiral on the exteriorly threaded portion 6 of the mandrel. Each link of one horizontal row has the loops at its ends encircling the body portions of two adjacent links of the next lower row; also, each link of one row has its body portion encircled by the loops of two adjacent links of the next higher row.

The links constructed as above indicated are placed in a hopper 17 mounted upon the table 1. A blade 18 projects upwardly through the bottom of this hopper and its upper end is inclined as shown at 19 in Fig. 4. This blade is arranged to be reciprocated within the hopper 17 in any suitable manner. In the drawings, the lower end of the blade is shown as pivotally connected to a link 20, whose lower end is pivotally connected to a lever 21. This lever is pivotally mounted upon a standard depending from the plate 1 and at its end distant from the link 20 is provided with a lengthwise slot. This slot is adapted to receive a wrist-pin 22 (Figs. 1 and 4), which connects two disks 23 and 24 mounted upon the adjacent ends of two sections of the power-shaft 3. Thus when the power-shaft is rotated, the blade 18 is caused to move up and down within the hopper 17. Preferably, the mechanism is arranged to subject the blade 18 to a light blow when the latter reaches the end of its upward movement. In the machine illustrated, this is accomplished by making the slot in the lever 21 of slightly greater width than the diameter of the wrist-pin 22. When the blade 18 reaches the upper end of its movement, the lower end of its inclined upper edge is in line with the bottom of a chute 25. This chute is of a cross-sectional shape substantially the same as the shape of the links when seen in the position in which they are shown in Fig. 5. As the blade 18 rises within the hopper 17, it passes upwardly through the mass of links within the hopper and more or less of these links assume a position straddling the upper edge of the blade and are carried upwardly by the blade. As the links so carried upwardly by the blade become freed from the mass of links within the hopper, they slide down the upper inclined edge of the blade. This sliding movement is facilitated by the light blow which is given to the blade when the latter reaches the upper end of its range of movement as above described. When the blade is at the upper limit of its movement, these links slide off the inclined upper edge of the blade and into the chute 25, the latter being inclined as shown. Within the chute, the links are supported in proper relative position by the ridge or tenon within the chute, which forms a continuation of the upper edge of blade 18 when the latter is in its uppermost position.

Mounted on the plate 1, is a support 26 (Fig. 1), on which a block 27 (Figs. 1 and 2) is pivotally mounted, so that it can be turned about an axis indicated by the reference 28 in Fig. 2. This block has a lengthwise groove in the upper face thereof, of semi-oval shape, as shown in Fig. 10, and secured in this groove is a tube 29 (Figs. 1, 2, 6 and 10). The block 27 has a sector-gear 30 (Figs. 1 and 2) secured to the under side thereof and adapted to mesh with a sector-gear 31 mounted upon the upper end of a rod 32 adapted to be oscillated in a bearing formed in the plate 1. The lower end of rod 32 has a crank 33 secured thereto, held by a spring 34 in engagement with a cam formed on the side of the disk 24. By this construction, during each rotation of shaft 3, the rod 32 will be oscillated by cam 24, and by means of the gears 31 and 30 will turn the block 27 about the axis 28 through an angle approximating ninety degrees, and then back to its original position.

The tube 29, heretofore referred to as mounted upon the block 27, has the upper half thereof cut away for a distance slightly greater than the length of a link, as indicated in Figs. 6, 7 and 10. When the block 27 and tube 29 are being moved as above described back to the position in which they are shown in Figs. 1 and 2, this opening in the upper side of the tube 29 passes under the lower end of the chute 25, which at its lower end is preferably substantially vertical. As this occurs, the links in the chute move downwardly, so that one link is received in the tube 29 through the opening in the tube above referred to. The block 29 does not, however, stop with this opening directly under the end of the chute 25, but moves beyond that point. As shown in Figs. 2 and 10, the end of the chute is displaced from the tube 29 when the latter is in its normal position. A link having been fed into the tube in this manner, it is moved forwardly to the end of the tube adjacent to the mandrel 5. This movement of the link is effected by a plunger 35 adapted to reciprocate within the tube 29. At its outer end, this plunger has a projection 36 (Fig. 1), adapted to be engaged by the upper end of a lever 37 pivotally mounted upon a standard depending from the table 1. The lower end of this lever is adapted to coact with a cam 38 secured upon the power-shaft 3, the end of the lever being held in engagement with the cam by a spring 39. As the block 27 moves about the axis 28 back to the position in which it is shown in Figs. 1 and 2, and in such movement receives a link within the tube 29, the projection 36 comes opposite the upper end of the lever 37. Immediately thereafter, the cam 38 acts upon lever 37 to cause the latter to move the plunger 35 forwardly within the tube 29. The forward end of the plunger engages the link in the tube and moves that link forwardly until the link projects beyond the end of tube 29 to the extent indicated in Fig. 7. Preferably this end of the tube 29 is contracted slightly, so that it will grasp and hold the link when the latter is so projecting from the end of the tube.

Fig. 6 shows the relative positions of the mandrel, the block 27 and the tube 29 carried by the block, when the block has been moved to the position in which it is shown in Figs. 1 and 2. A link is shown at 40 within the tube 29. In Fig. 6, the end of the chute 25 is shown, but it will be understood that this chute is not in alinement with tube 29 but is displaced therefrom as shown in Fig. 10. After the plunger 35 has been moved forward in the manner above described, the parts are carried to the positions in which they are shown in Fig. 7. In projecting the link forward from the end of tube 29 in this manner, the end of the link is carried between the ends of a link depending from the lower end of the sleeve of fabric upon the mandrel 5. In Fig. 7, the reference 41 indicates the two ends of a link and the reference 42 indicates the two ends of the next adjacent link. It will be seen that one end of the link 41 is closely adjacent to one end of the link 42, and that the forward end of the link 40, which is to be added to the mesh, is projected between the two ends of the link 41 and is directly opposite the openings through the adjacent looped ends of the links 41 and 42. Just at this time, the cam 24 acts through the arm 33, rod 32 and gears 30 and 31, to turn the block 27 and the tube 29 carried thereby through an angle approximating ninety degrees, thus carrying the tube and the link 40 held thereby to the position shown in Figs. 8 and 9. As this occurs, the end of the link 40 projecting from tube 29 is threaded through the adjacent looped ends of links 41 and 42. Fig. 8 shows the positions of the parts near the end of this movement. To facilitate the threading of the new link in this manner, the surface of the stationary mandrel 5 may be cut away slightly as shown at 43, so as to permit the link 41 to tilt a small amount. Just as the block 27 and tube 29 near the end of this rotational movement about the axis 28, the projection 36 on the rear end of the plunger 35 engages a cam surface 44 and the plunger is moved forwardly within the tube 29 a small amount, sufficient to force the link 40 from the end of tube 29. This position of the parts is shown in Fig. 9. The cam 44 is adjustably mounted upon standards rising from the table 1, the adjustment permitting of regulating the movement of the plunger 35 caused by the cam, so that it will be just sufficient to discharge the link 40 from the end of the tube 29. As the block 27 reaches the end of its rotational movement in this direction, the projection 36 passes beyond the end of the cam 44, and beyond the end of a spring-finger 45 at the end of the cam. The rotation of the power-shaft 3 then carries the cam 24 around to such position that the spring 34 may return rod 32 and the parts connected thereto to their initial positions, the gearing 31 and 30 resulting in the block 27 being carried back to the position in which it is shown in Fig. 2. As this occurs, the projection 36 on the outer end of the plunger 35 is caught by the spring-finger 45 and forced to travel upon the outer side of the cam 44, which cam is of such shape that during the return movement of the block 27 the plunger 35 is retracted to its outermost position. The plunger 35 is drawn outwardly in this way, so that its end is beyond the opening in the tube 29 when the latter passes under the end of the chute 25, so that during this return movement of the block 27 the tube 29 receives another link from the chute. It will be noted that the upper surface of the block 27 is extended by a curved projection 46 (Fig. 2), which serves to close the lower end of the chute 25 when the block 27 has been turned to the Figs. 8 and 9 position. As the block 27 is being returned thus and is receiving a new link, the ratchet-and-pawl mechanism hereinafter described operates to turn the sleeves 7 and 8 one step, so that the fabric is carried around upon the stationary mandrel to such position that the next link will be added to the fabric in the proper position.

The operation of the machine in the manner described is continuous and automatic. The operation of the feeder insures that a supply of links will always be present in the chute or feeding channel and these links will all be properly arranged for coaction with the parts of the machine as the tenon in the bottom of the channel receives the links from the upper edge of the feeder and holds them in the proper relation. Each time the tube and block are moved back to normal position, the tube receives one link from the bottom of the channel. In so picking up the link, the latter is moved in the direction of its shorter dimension and by reason of this the mechanism can be relied on to feed but one link at a time and to feed this smoothly and without any interference. If the link were fed away from the chute in the direction of its larger dimension, there would be apt to be interference due to the looped end of the link withdrawn catching upon a looped end of the next higher link. Between the times of withdrawing links from the chute into the tube, the lower end of the chute is closed by the upper surface of the block 27 except when the tube 29 is passing under chute 25 in turning from the position in which it is shown in Fig. 2 at which time the opening in the tube 29 is closed by the plunger 35 which is then in the forward position. After the link is received in the tube 29 it is fed forward until its end is projected from the end of the tube, then turned to thread it through the loops of adjacent links of the mesh and then released from the tube as indicated in Figs. 6 to 9. On being released, the link turns by gravity to a position with its looped ends directed downwardly so that they will be in position to receive links when the sleeve of the fabric has been turned through one revolution.

It will be appreciated that the construction illustrated may be modified in various ways without departing from the principles of the invention. Thus instead of a piece of fabric in the form of a sleeve and a mandrel for supporting it, I may employ a flat piece of fabric and means for moving this step by step to present the proper points thereon to the link-feeding and threading mechanism.

In some cases, it may be desirable to provide a machine of the character described with mechanism for opening the loops at the ends of the links, after those links have been added to the fabric. With such mechanism, the threading of the end of one link through the loops at the ends of two others would be much more readily effected as the end of the link to be threaded would be comparatively thin or flat. Its side walls would be spread apart somewhat but not enough to cause obstruction of the feeding movement of the end of the link through the loops of the links of the fabric with which it is to be meshed. Thereafter, these side walls at the ends of the link would be spread apart far enough to make the loops formed thereby of the proper dimensions and thus facilitate the entrance of the ends of the added links through them.

I have shown a mechanism for operating in this manner in the accompanying drawings and this will now be described in connection with Figs. 1, 2, 11 and 12. This mechanism comprises means whereby each link of the mesh may be subjected to pressure whereby the side walls of the narrow loops at the ends of the links will be spread apart. In the mandrel 5 is a radial opening which receives a short rod 50 which has prongs 51 (Fig. 12) at its outer end. This rod is normally drawn inwardly with respect to the mandrel 5 by a spring 52. Within a vertically disposed opening in the mandrel is a rod 53 having a conical surface near its upper end which surface is adapted to engage the inner end of rod 50. The rod 53 is connected at its lower end by a pin and slot connection to an arm 54 pivotally mounted on the frame of the machine and carrying a roller 55 at its free end which roller is adapted to ride on a cam 56 secured to the power shaft 3. As the cam is rotated it will operate to raise arm 54 and rod 53 and the cam surface on rod 53 will operate to project the rod 50 against the tension of spring 52. As the rod is so projected the prongs 51 will move out directly over the top of a link of the fabric, one prong over each end of the body-portion of the link and the space between the prongs receiving the ends of the links whose loops encircle that body-portion. This position of the rod 50 is shown in Fig. 11. Immediately after the prongs 51 are projected over the upper edge of the body-portion of a link, a pressing member is raised into engagement with the lower ends of that link. This pressing member is shown at 57 in Figs. 3 and 11. It is adapted to move vertically in suitable guide openings and at its lower end is connected by a pin and slot with the arm 54. The slot 58 in the rod 57 is of such length that the rod 57 will not be raised until the arm 54 has been raised a substantial distance, that is, until the rod 50 has been projected radially to its outermost position. By this mechanism the body-portion of a link is held from above by the prongs 51 and immediately thereafter the upper end of rod 57 is raised into engagement with the ends of that link and is then raised sufficiently thereafter to cause the link to be subjected to pressure between the rod 57 and prongs 51. Under this pressure the narrow loops in the ends of the link are spread so that the openings through those ends are enlarged to the desired extent.

Another way in which the mechanism above described may be modified, without departing from the spirit of my invention, is illustrated in Figs. 13, 14, 15 and 16. In the machine shown in the preceding figures the movement of the link necessary to thread its end through the loops of links of the fabric is effected by turning the tube through which the links are fed about an axis adjacent to the surface of the fabric. Instead of doing this the tube may remain stationary or its movement may be limited to that required to feed links from the chute 25 into the tube and the links may be fed from the tube into a threading device which is moved as required to mesh the link held thereby with the links of the fabric. This latter construction is illustrated in Figs. 13 to 16. The tube 60 corresponds in all respects to the tube 29 shown in Figs. 1 to 10 except that it is cut away slightly at its end, as hereinafter described. This tube may be stationarily mounted or it may be arranged to have a slight lateral or pivotal movement in order to carry it to and from the end of the chute 25. At its end, adjacent to the mandrel, the bottom wall of the tube is cut away as shown at 61 in Figs. 13, 14 and 15. The plunger 35 moves a link which has been fed into the tube, forwardly within the tube, in the manner before described until that link has reached the position shown at 62 by dotted lines in Fig. 13. In the plate 1 is an opening which receives a rod 63 adapted to have both a rotary and an axial movement. Above plate 1 this rod carries a pincer-arm 64 which is mounted eccentrically with respect to the rod 63. On the arm 64 is pivotally mounted a second pincer-arm 65, the latter being actuated by a spring 66 to move to the open position. The lower end of rod 63 carries a roller 67 which rides on the surface of a cam 68. The rod 63 also carries a gear 69 which is engaged by a gear 70 on a rotary shaft 71. Fig. 15 shows the normal position of these parts. It will be seen that the upper ends of the pincer-arms are directly below that end of a link projecting from tube 60 which end is distant from the mandrel 5. With the parts in the position shown in Fig. 15 the cam 68 operates to raise rod 63 and the pincer-arms carried thereby. The end of arm 65 enters the opening 61 on the rear side of the rear end of the link 62 and the upper end of the arm 64 passes up on the forward side of that end of the link. As the arms 64 and 65 are raised thus, the lower end of the arm 65 engages a stop 72 stationarily mounted on the plate 1. The coaction of the arm with this stop, as the arm is raised vertically, causes the arm to turn about its pivotal connection to the arm 64 against the tension of the spring 66. As arm 66 turns thus it draws the link 62 out of the end of the tube 60 and grasps the rear end of the link between the arm 65 and the arm 64. The link is then in the position in which it is shown by the full lines in Fig. 13, in which figure it will be noted that the rear end of the link is held between the pincer-arms. After these movements take place, the shaft 71 is given a partial rotation and operates through the gears 70 and 69 to impart a partial rotation to the rod 63 causing that rod and the parts carried thereby to rotate in the direction of the arrow in Fig. 16. It will be seen that the cam 72 has its inner surface curved about the axis of rotation of shaft 63 as shown at 73 in Fig. 16, so that while the pincer-arms are being rotated by the rotation of shaft 63, those arms will be held in gripping relation to the link. The extent of rotation of shaft 63 and the location of the pincer-arms with respect to the axis of rotation of that shaft are such that the rotation of the shaft causes the link held by the pincer-arms to move over a path such that the forward end of the link is fed through the loops of two coacting links of the mesh on mandrel 5. As the link nears the end of this movement the lower end of arm 65 rides upon the portion 74 of the cam 72 which recedes from the axis of rotation, and as this occurs the spring 66 moves the pincer-arm 65 to cause the latter to release the link. Immediately after this occurs the cam 68 allows the rod 63 and the pincer-arms carried thereby to be moved downwardly so as to carry the upper ends of the pincer-arms below the plane of tube 60, such downward movement of the rod 63 being effected by a spring 75. By this construction it will be seen that the links are fed forward successively through the tube 60; that after each link is fed forward, the pincer-arms are raised, and in being raised are caused to grasp the rear end of the link; that the pincer-arms are then rotated through a portion of a revolution so as to mesh the link held thereby with the links of the mesh on the mandrel; that the pincers then release the link and move downwardly; and that the pincer-arms are then rotated back to their initial position in readiness to grasp the next link.

Having now described my invention, what I claim as new therein and desire to secure by Letters Patent is as follows:—

1. In a link-mesh machine, the combination of means for supporting a piece of link-mesh, means for advancing links successively into coöperative relation to the links of the mesh, and means for turning each link so fed about an axis parallel to the surface of the piece of mesh and thereby linking it with the mesh, substantially as set forth.

2. In a link-mesh machine, the combination of means for supporting a piece of link-mesh and moving it step by step in the direction of the length and in the direction of the width of the mesh, means for advancing links successively into coöperative relation to the links of the mesh, and means for turning each link so fed about an axis parallel to the surface of the piece of mesh and thereby linking it with the mesh, substantially as set forth.

3. In a link-mesh machine, the combination of means for supporting a piece of link-mesh, each link of the mesh having loops at its ends, means for positioning links successively in coöperative relation to the links of the mesh, and means for turning each link so positioned about an axis parallel to the surface of the piece of mesh and thereby threading its end through loops of the links of said mesh, substantially as set forth.

4. In a link-mesh machine, the combination of means for supporting a piece of link-mesh, each link having its ends depending and having loops in such ends, means for advancing links successively and projecting the end of each link between the depending looped ends of a link of said mesh, and means for turning each link so advanced about an axis parallel to the surface of the piece of mesh and thereby threading its end through the loops in links of said mesh, substantially as set forth.

5. In a link-mesh machine, the combination of means for supporting a piece of link-mesh, each link having its ends depending and having loops in such ends, means for advancing links successively and projecting the end of each link between the depending looped ends of a link of said mesh, and means for turning the links so advanced about an axis and thereby threading their ends through the loops in the links of said mesh, substantially as set forth.

6. In a link-mesh machine, the combination of means for supporting a piece of link-mesh, each link having its ends depending and having loops in such ends, means for moving the mesh step by step in the direction of its length and in the direction of the width of the mesh, means for advancing links successively and projecting the end of each link between the depending looped ends of a link of said mesh, and means for turning the links so advanced about an axis and thereby threading their ends through the loops in the links of said mesh, substantially as set forth.

7. In a link-mesh machine, the combination of means for supporting a piece of link-mesh, each link having its ends depending and having loops in such ends, a receptacle for links similar to those of said piece, and automatic means for feeding links from the receptacle to the piece of mesh and threading the end of each link so fed through loops in the ends of two adjacent links of the piece of mesh, substantially as set forth.

8. In a link-mesh machine, the combination of means for supporting a piece of link-mesh, each link having its ends depending and having loops in such ends, means for moving the piece in the direction of the width and the direction of the length of the fabric step by step, a receptacle for links similar to those of said piece and automatic means operating during the intervals of rest of said step by step movement to feed a link from said receptacle to said piece of mesh and thread its end through the loops of two adjacent links of the piece of fabric, substantially as set forth.

9. In a link-mesh machine, the combination of means for supporting a piece of link-mesh, each link having its ends depending and having loops in such ends, a receptacle for links similar to those of the mesh, and automatic means for feeding links from the receptacle to the piece of mesh and turning each link about an axis parallel to the surface of the piece of mesh to thread its end through the loops of two adjacent links of the piece of mesh, substantially as set forth.

10. In a link-mesh machine, the combination of means for supporting a piece of link-mesh, each link having its ends depending and having loops in such ends, means for moving the piece in the direction of the width and the direction of the length of the fabric step by step, a receptacle for links similar to those of said piece and automatic means operating during the intervals of rest of said step by step movement to feed a link from said receptacle to said piece of mesh, and turn the link about an axis parallel to the surface of the piece of mesh so as to thread its end through the loops of two adjacent links of the piece of fabric, substantially as set forth.

11. In a link-mesh machine, the combination of means for supporting a piece of link-mesh, each link having its ends depending and having loops in such ends, a receptacle for links, a feeder for feeding links from the receptacle successively and projecting their ends between the depending looped ends of links of said mesh, and means for turning the links so advanced about an axis and thereby threading their ends through the loops in the links of said mesh, substantially as set forth.

12. In a link-mesh machine, the combination of means for supporting a piece of link-mesh, each link having its ends depending and having loops in such ends, means for moving the mesh step by step in the direction of its length and in the direction of the width of the mesh, a receptacle for links, a feeder for feeding links from the receptacle successively and projecting their ends between the depending looped ends of links of said mesh, and means for turning the links so advanced about an axis and thereby threading their ends through the loops in the links of said mesh, substantially as set forth.

13. In a link-mesh machine, the combination of means for supporting a sleeve of link-mesh fabric, means for rotating said fabric step by step and simultaneously moving it in the direction of its axis, means for advancing links successively into coöperative relation to the links of the fabric, and means for turning the links so fed about an axis parallel to the axis of said sleeve to link them with the links of the fabric, substantially as set forth.

14. In a link-mesh machine, the combination of means for supporting a sleeve of link-mesh fabric, each link having its ends depending and having loops in such ends, means for rotating said fabric step by step and simultaneously moving it in the direction of its axis, means for advancing links successively and projecting their ends between the depending looped ends of links of said fabric, and means for turning the links so advanced about an axis parallel to the axis of said sleeve and thereby threading the end of each link through the loops in two adjacent links of said fabric, substantially as set forth.

15. In a link-mesh machine, the combination of means for supporting a piece of link-mesh, means for feeding links successively to the mesh with each link so fed lying in a plane transverse to the plane of the links of the mesh and means for turning each of the links so fed bodily in the plane in which it lies to mesh it with those of the mesh and then releasing the link, substantially as set forth.

16. In a link-mesh machine, the combination of means for supporting a piece of link-mesh, each link having its ends depending and having loops in said ends, means for feeding similar links successively to the mesh with each link so fed lying in a plane transverse to the plane of the links of the mesh and means for threading the end of each link so fed through loops of links of the piece of mesh and then releasing the link to permit it to drop to the position of the other links of the piece of mesh, substantially as set forth.

17. In a link-mesh machine, the combination of means for supporting a piece of link-mesh, each link having its ends depending and having loops in said ends, means for feeding similar links successively to the mesh so that each link so fed projects between the ends of a link of the mesh and lies in a plane transverse to the plane of the links of the mesh, and means for turning each link so fed about an axis parallel to the surface of the piece of mesh to thread its end through the loops in the ends of two adjacent links of the fabric and then releasing the link to permit it to fall to the position of the other links of the fabric, substantially as set forth.

18. In a link-mesh machine, the combination of means for supporting a sleeve of link-mesh fabric, each link having its ends depending and having loops in such ends, means for rotating said fabric step by step and simultaneously moving it in the direction of its axis, a receptacle for links, a feeder for feeding links from the receptacle successively and projecting their ends between the depending looped ends of links of said fabric, and means for turning the links so advanced about an axis and thereby threading their ends through the loops in the links of said fabric, substantially as set forth.

19. In a link-mesh machine, the combination of a receptacle for links, each link having a shape approximating a semicircle, a feeder whose upper edge is of a size adapted to fit between the sides of a link, means for reciprocating the feeder within the receptacle, a feeding channel leading from the receptacle and adapted to receive links from the upper edge of said feeder, the entrance to the channel being so located as to aline with the sides and upper end of the feeder when the latter is in the highest position, a support for a piece of link-mesh, and means for successively meshing links received from said channel with the links of said mesh, substantially as set forth.

20. In a link-mesh machine, the combination of a receptacle for links, each link having a shape approximating a semicircle, a feeder whose upper edge is of a size adapted to fit between the sides of a link, means for reciprocating the feeder within the receptacle, means for subjecting the feeder to a blow when it is in its highest position, a feeding channel leading from the receptacle and adapted to receive links from the upper edge of said feeder, the entrance to the channel being so located as to aline with the sides and upper end of the feeder when the latter is in the highest position, a support for a piece of link-mesh, means for moving the mesh step by step in the direction of the length and in the direction of the width of the mesh, and means for successively meshing links received from said channel with the links of said mesh, substantially as set forth.

21. In a link-mesh machine, the combination of a receptacle for links, each link having a shape approximating a semicircle, a feeder whose upper edge is of a size adapted to fit between the sides of a link, means for reciprocating the feeder within the receptacle, a feeding channel leading from the receptacle and adapted to receive links from the upper edge of said feeder, the entrance to the channel being so located as to aline with the sides and upper end of the feeder when the latter is in the highest position, a support for a piece of link-mesh, and means for successively turning links received from said channel about an axis and thereby threading the ends thereof through links of said mesh, substantially as set forth.

22. In a link-mesh machine, the combination of a receptacle for links, each link having a shape approximating a semicircle, a feeder whose upper edge is of a size adapted to fit between the sides of a link, means for reciprocating the feeder within the receptacle, a feeding channel leading from the receptacle and adapted to receive links from the upper edge of said feeder, a support for a piece of link-mesh, means for moving the mesh step by step in the direction of the length and in the direction of the width of the mesh, means for successively advancing links from said channel into coöperative relation to said mesh, and means for turning the links so advanced about an axis and thereby linking them with those of said mesh, substantially as set forth.

23. In a link-mesh machine, the combination of a support for a piece of link-mesh, the several links having loops at their ends, means for moving said mesh step by step, a tubular holder adjacent to the mesh, means for successively feeding links through the holder so that their ends project from the end of the holder, means for moving the holder about an axis to thread the link therein through a loop in a link of the mesh, and means for causing the holder to release a link, substantially as set forth.

24. In a link-mesh machine, the combination of a support for a piece of link-mesh, means for moving said mesh step by step, a holder adjacent to the mesh, means for successively feeding links into the holder, means for moving the holder about an axis parallel to the surface of the piece of mesh to mesh the link in the holder with the mesh, and means for causing the holder to release the link, substantially as set forth.

25. In a link-mesh machine, the combination of a receptacle for links, each link having a shape approximating a semicircle, a feeder whose upper edge is of a size adapted to fit between the sides of a link, means for reciprocating the feeder within the receptacle, a feeding channel leading from the receptacle and adapted to receive links from the upper edge of said feeder, the entrance to the channel being so located as to aline with the sides and upper end of the feeder when the latter is in the highest position, a support for a piece of link-mesh, means for moving the mesh step by step, a holder adjacent to the mesh and receiving links from said channel, means for turning the holder and the link therein to thread the end of the link through links of the piece of mesh, and means for causing the holder to release the link, substantially as set forth.

26. In a link-mesh machine, the combination of a receptacle for links, a channel leading therefrom, feeding devices for transferring links from the receptacle to the channel, a tube adjacent to the lower end of the channel having an opening in the side thereof, means for transferring links one at a time from the channel to the tube through said opening in the tube, a plunger operating in the tube to move the links therein, a support for holding a piece of link-mesh adjacent to the end of the tube, and means for meshing links advanced through the tube with those of said mesh, substantially as set forth.

27. In a link-mesh machine, the combination of a channel for links, a tube supported adjacent to the end of the channel having an opening in its side, a plunger operating in the tube and means for moving the tube past the channel so that the tube receives a link from the channel through the opening in the tube, then moving the plunger to advance the link in the tube and close said opening, then moving the tube past the channel again and then retracting the plunger to again present the opening in the tube to the channel, substantially as set forth.

28. In a link-mesh machine, the combination of a support for a piece of link-mesh, a tube projecting toward the mesh, means for feeding links successively into the tube, a plunger in the tube, means for reciprocating the plunger to advance the link in the tube and project its end from the end of the tube, and means for turning the tube about an axis to mesh the link so projected with those of said piece, substantially as set forth.

29. In a link-mesh machine, the combination of a support for a piece of link-mesh, a tube projecting toward the mesh and having its end contracted, means for feeding links successively into the tube, a plunger in the tube, means for reciprocating the plunger to advance the link in the tube and project one end thereof from the end of the tube, the opposite end of the link being held by the contracted end of the tube, and means for meshing the link so projected with those of said piece, substantially as set forth.

30. In a link-mesh machine, the combination of a support for a piece of link-mesh, a tube projecting toward the mesh, means for feeding links successively into the tube, a plunger in the tube, means for reciprocating the plunger to advance the link in the tube and project its end from the end of the tube, means for moving the tube and the link therein to mesh the link with those of the piece of mesh and means for further moving the link to discharge it from the end of the tube, substantially as set forth.

31. In a link-mesh machine the combination of a support for a piece of link-mesh, a tube projecting toward the mesh, means for feeding links successively into the tube, a plunger in the tube, means for reciprocating the plunger to advance the link in the tube and project its end from the end of the tube, and means for turning the tube about an axis adjacent to the surface of the piece of mesh to mesh the link projecting from the end of the tube with those of the mesh, substantially as set forth.

32. In a link-mesh machine, the combination of a support for a piece of link-mesh fabric, a channel for links, means for taking links from the channel successively and advancing each link so that its end is adjacent to the fabric, and means for holding each link in a predetermined relation to the fabric and turning it about an axis to thread one end thereof through links of the fabric, substantially as set forth.

33. In a link-mesh machine, the combination of a support for a piece of link-mesh fabric, each link thereof having its ends depending and having loops in said ends, means for moving the fabric step by step, a channel for links, means for taking links from the channel successively and advancing them toward the fabric, and means for holding each link in a predetermined relation to the fabric and turning it to thread one end thereof through loops in links of the fabric on said support, substantially as set forth.

34. In a link-mesh machine, the combination of a support for a piece of link-mesh fabric consisting of a multiplicity of separately formed intermeshed links, each link thereof having loops therein at its ends, means for meshing links with those of the fabric, and means for automatically opening the loops in the ends of the links to permit threading the ends of other links therethrough, substantially as set forth.

35. In a link-mesh machine, the combination of a support for a piece of link-mesh fabric consisting of a multiplicity of separately formed intermeshed links, each link thereof having loops therein at its ends, means for meshing links with those of the fabric, and means for automatically opening the loops in the ends of the links after the links have been added to the fabric to permit threading the ends of other links therethrough, substantially as set forth.

36. In a link-mesh machine, the combination of a support for a piece of link-mesh fabric consisting of a multiplicity of separately formed intermeshed links, each link thereof having loops therein at its ends, means for advancing links successively to a position adjacent to the fabric, means for moving the links so advanced to thread them through the loops in the links of the fabric, and means for automatically opening the loops in the ends of the links to permit threading the ends of other links therethrough, substantially as set forth.

37. In a link-mesh machine, the combination of a support for a piece of link-mesh fabric, each link thereof having loops at its ends, means for meshing links with those of the fabric, and means for automatically subjecting the loops of each link to pressure to cause the side walls thereof to spread apart, substantially as set forth.

38. In a link-mesh machine, the combination of means for supporting a piece of link-mesh consisting of a multiplicity of separately formed intermeshed links, each link of the mesh having loops therein at its end, means for advancing links successively into coöperative relation to the links of the mesh, means for turning the links so fed about an axis to link them with the links of the mesh and means for enlarging the loops in the ends of the links of the mesh to permit threading the ends of other links therethrough, substantially as set forth.

39. In a link-mesh machine, the combination of means for supporting a piece of link-mesh consisting of a multiplicity of separately formed intermeshed links, each link of the mesh having loops at its ends, means for feeding links successively to the mesh and threading their ends through the loops of the links of the mesh and means for enlarging the loops in the ends of links on the mesh to permit threading the ends of other links therethrough, substantially as set forth.

40. In a link-mesh machine, the combination of means for supporting a piece of link-mesh and moving it step by step in the direction of the length and in the direction of the width of the mesh, means for feeding disconnected links successively to the mesh and threading them through the loops in the ends of links of the mesh and means for enlarging the loops in the ends of links of the mesh to permit threading the ends of other links therethrough, substantially as set forth.

41. In a link-mesh machine, the combination of means for supporting a piece of link-mesh, each link having its ends depending and having loops in such ends, means for advancing disconnected links successively and projecting their ends between the depending looped ends of links of the mesh, means for turning the links so advanced about an axis and thereby threading their ends through the loops in the links of the mesh and means for enlarging the loops in the ends of links of the mesh to permit threading the ends of other links therethrough, substantially as set forth.

42. In a link-mesh machine, the combination of a support for a piece of link-mesh, each link of the mesh having loops formed therein at its ends, means for moving the piece of mesh step by step, a supply device for links, means for feeding disconnected links successively from said device into coöperative relation to the piece of mesh, means for turning each link so fed about an axis to thread one end thereof through loops in links of the mesh, and means for enlarging the loops in the ends of links of the mesh to permit threading the ends of other links therethrough, substantially as set forth.

43. In a link-mesh machine, the combination of means for supporting a piece of link-mesh, each link of the mesh having loops at its ends, means for threading links successively through the loops of links of the mesh so as to add links to the mesh and means for subjecting links of the mesh to pressure to cause the loops at the ends of such links to be enlarged, substantially as set forth.

44. In a link-mesh machine, the combination of means for supporting a piece of link-mesh, each link having loops formed therein at its ends, means for moving the piece of mesh step by step in the direction of the length and in the direction of the width of the piece, means for advancing links successively to the mesh, means for threading the links so advanced through the loops in the links of the mesh and means for subjecting links of the mesh to pressure to thereby enlarge the loops in the ends of such links, substantially as set forth.

45. In a link-mesh machine, the combination of means for supporting a piece of link-mesh, each link having its ends depending and having loops in such ends, and means for advancing disconnected links successively to said piece of mesh and threading the ends of the links so advanced through the loops in the ends of links of said piece of mesh, substantially as set forth.

46. In a link-mesh machine, the combination of means for supporting a piece of link-mesh, each link having its ends depending and having loops in such ends, and means for advancing disconnected links successively to said piece of mesh and turning each link so advanced about an axis and thereby threading its end through the loops in links of said piece of mesh, substantially as set forth.

47. In a link-mesh machine, the combination of means for supporting a piece of link-mesh, each link having its ends depending and having loops in such ends, means for advancing disconnected links successively to said piece of mesh to carry one end of each link in proximity to the loops in the ends of two adjacent links of said piece of mesh, and means for turning each link so advanced to thread its end through the loops in said two adjacent links, substantially as set forth.

This specification signed and witnessed this 24th day of January, 1912.

ALPHONSO C. PRATT.

Witnesses:
CHARLES E. KELLY,
A. YOUNGHOLM.

Copies of this patent may be obtained for five cents each, by addressing the "Commissioner of Patents, Washington, D. C."